US008713647B2

(12) United States Patent
Waidner

(10) Patent No.: US 8,713,647 B2
(45) Date of Patent: Apr. 29, 2014

(54) END-OF-SESSION AUTHENTICATION

(75) Inventor: Michael P. Waidner, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 12/545,136

(22) Filed: Aug. 21, 2009

(65) Prior Publication Data

US 2011/0047602 A1 Feb. 24, 2011

(51) Int. Cl.
*G06F 21/00* (2013.01)

(52) U.S. Cl.
USPC ............... 726/5; 726/3; 726/21; 713/186

(58) Field of Classification Search
USPC ......... 726/5, 3, 6, 7, 18–21; 713/186; 382/115
See application file for complete search history.

(56) References Cited

U.S. PATENT DOCUMENTS

| | | | | |
|---|---|---|---|---|
| 7,562,382 | B2 * | 7/2009 | Hinton et al. | 726/2 |
| 7,577,582 | B1 * | 8/2009 | Ojha et al. | 705/26.3 |
| 8,082,349 | B1 * | 12/2011 | Bhargava et al. | 709/227 |
| 8,280,009 | B2 * | 10/2012 | Stepanian | 379/1.01 |
| 2001/0005887 | A1 * | 6/2001 | Boroditsky et al. | 713/183 |
| 2001/0037264 | A1 * | 11/2001 | Husemann et al. | 705/26 |
| 2002/0099649 | A1 * | 7/2002 | Lee et al. | 705/38 |
| 2003/0105725 | A1 * | 6/2003 | Hoffman | 705/75 |
| 2003/0131260 | A1 * | 7/2003 | Hanson et al. | 713/201 |
| 2003/0208682 | A1 * | 11/2003 | Zissimopoulos et al. | 713/182 |
| 2004/0128393 | A1 * | 7/2004 | Blakley et al. | 709/229 |
| 2004/0187023 | A1 * | 9/2004 | Alagna et al. | 713/200 |
| 2006/0031174 | A1 * | 2/2006 | Steinmetz | 705/67 |
| 2006/0294023 | A1 * | 12/2006 | Lu | 705/67 |
| 2007/0073630 | A1 * | 3/2007 | Greene et al. | 705/80 |
| 2007/0150416 | A1 * | 6/2007 | Friedman | 705/57 |
| 2007/0187491 | A1 * | 8/2007 | Godwin et al. | 235/380 |
| 2007/0245158 | A1 * | 10/2007 | Giobbi et al. | 713/186 |
| 2007/0250916 | A1 * | 10/2007 | Shull et al. | 726/5 |
| 2007/0250920 | A1 * | 10/2007 | Lindsay | 726/7 |
| 2007/0288758 | A1 * | 12/2007 | Weiss | 713/186 |
| 2008/0066168 | A1 * | 3/2008 | Gregg et al. | 726/7 |
| 2008/0110983 | A1 * | 5/2008 | Ashfield | 235/382 |
| 2008/0178270 | A1 * | 7/2008 | Buss | 726/5 |

FOREIGN PATENT DOCUMENTS

| | | | | |
|---|---|---|---|---|
| WO | WO 2006069311 | A2 * | 6/2006 | G06F 21/24 |
| WO | WO 2007044882 | | 4/2007 | |
| WO | WO 2007064584 | | 6/2007 | |
| WO | WO 2007114826 | | 10/2007 | |

OTHER PUBLICATIONS

Wiesmaier et al., "Outflanking and Securrely Using the PIN/TAN-System" arXIV:cs/0410025v3 [cs.CR] May 26, 2005.

* cited by examiner

*Primary Examiner* — Jung Kim
*Assistant Examiner* — Shan Elahi
(74) *Attorney, Agent, or Firm* — Daniel P. Morris; Ryan, Mason & Lewis, LLP

(57) ABSTRACT

Techniques for facilitating an online transaction session with an end-of-session authentication are provided. The techniques include performing a start-of-session authentication to enable an online transaction session, and performing an end-of-session authentication to end the online transaction session, wherein the end-of-session authentication comprises a scope comprising each pre-defined critical transaction from the transaction session.

22 Claims, 2 Drawing Sheets

END-OF-SESSION AUTHENTICATION

FIELD OF THE INVENTION

Embodiments of the invention generally relate to information technology, and, more particularly, to online transactions.

BACKGROUND OF THE INVENTION

Existing approaches for securing user-initiated online transactions include authenticating the user at the beginning of a session (for example, when the user opens the online banking application, or starts the check-out process at an online retailer). This initial authentication is a necessary step for most online transactions, but it is very vulnerable to unwanted attacks (for example, attacks where the user is tricked into entering his secret credentials, such as a username and password, into a fake application that looks like the real one, but is set up by a wrong-doer).

Existing approaches to counter such attacks include using two-factor authentication (for example, using a static and a one-time password, or using a password and a secure hardware token) or improving the authentication of the online application towards the user. However, none of these mechanisms eliminate the risk completely, and many also have the problem of being complicated to use or expensive to introduce.

SUMMARY OF THE INVENTION

Principles and embodiments of the invention provide techniques for an end-of-session authentication. An exemplary method (which may be computer-implemented) for facilitating an online transaction session with an end-of-session authentication, according to one aspect of the invention, can include steps of performing a start-of-session authentication to enable an online transaction session, and performing an end-of-session authentication to end the online transaction session, wherein the end-of-session authentication comprises a scope comprising each pre-defined critical transaction from the transaction session.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
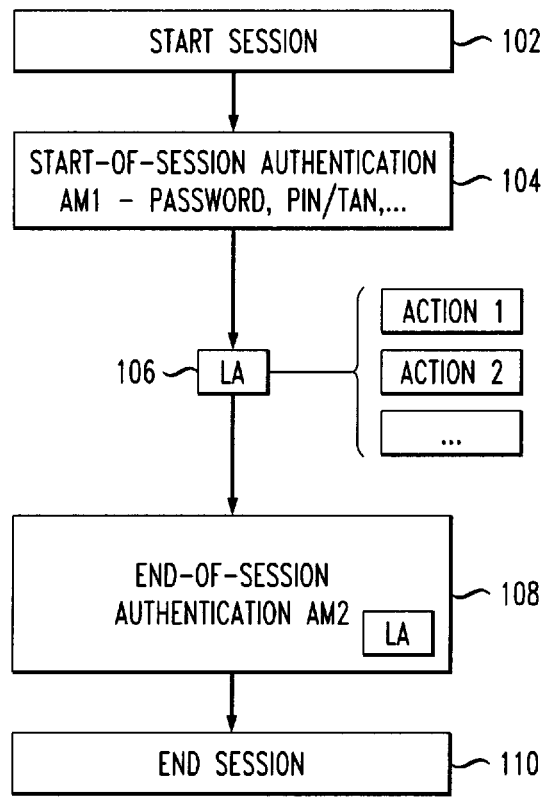
FIG. 1 is a diagram illustrating an exemplary session incorporating end-of-session authentication componentry, according to an embodiment of the present invention.

Principles of the invention include end-of-session authentication techniques for performing online banking transactions or online purchases. One or more embodiments of the invention include performing an authentication not only at the beginning of a user session, but also as mandatory step at the end of a user session. By way of example, in one or more embodiment of the invention, a failure at the end of a session authentication raises a security alarm. Additionally, the techniques described herein are particularly efficient against unwanted attacks, as a wrong-doer would have to take over the complete session in order to be successful.

As detailed herein, unlike the disadvantages of existing approaches, one or more embodiments of the invention include a second ($2^{nd}$) authentication that has, as scope, each pre-defined critical transaction from the transaction session and not just a single step.

As described herein, one or more embodiments of the invention add a user authentication step to the end of a user session. For example, in one or more embodiments of the invention, at the end of the session the user can be shown a summary of the session activities, and then asked to enter an end-of-session password. Any authentication mechanism can be used as long as the mechanism includes using credentials different from those used earlier in the same session (for example, different passwords, different transaction authentication numbers (TANs), a different personal identification number (PIN), etc.).

A failure at the end-of-session authentication can raise a security alarm, and in one or more embodiments of the invention, can result in a roll-back or non-commit of transactions started in the session. For example, in one or more embodiments of the invention, a failure of end-of-session authentication can invalidate the credentials used for initial authentication, making them useless for an adversary, or a failure can increase the security level required the next time the user (or someone who impersonates the user) creates a new session.

Requiring authentication at the end of a session makes unwanted attacks more difficult, as an adversary needs to catch not only the credentials used for initial authentication (for example, the user name, password, TAN, etc.) but must simulate or observe a full session to capture also the credentials used for the end-of-session authentication. Additionally, when combined with a review of the session activities, the end-of-session authentication increases transparency for the user. Further, it makes it more difficult for a person-in-the-middle adversary to insert phony activities into a legitimate session, as the user has a greater chance to capture such transaction in the final summary (for example, read, given through an out-of-band mechanism, read to the user over the phone, etc.).

In one or more embodiments of the invention, an end-of-session authentication can be combined with a review and/or summary performed out-of-band (for example, through a call-back to the user or another independently secured channel). Such a technique would further enhance security of the transaction because an adversary cannot control the out-of-band channel nor can the adversary simulate or fake that interaction.

The techniques described herein do not aim at protecting or confirming a specific transaction but rather at protecting a scope of each pre-defined critical transaction from the transaction session, which can include multiple steps, not all of them necessarily of transactional character (that is, they might be informational only, or without a roll-back property). Also, in one or more embodiments of the invention, a failure of end-of-session authentication does not necessarily lead to a failure of the session, but might simply create a security alarm.

One or more embodiments of the invention can be implemented in any online system that supports the concept of a user session for registered users. By way of example, the techniques described herein can be implemented in a typical online banking scenario as follows. A user opens a banking session, for example, by visiting the bank's home page. The user authenticates towards the bank, using an authentication method and credentials (referred to herein, for example, as AMU. The user performs various actions such as, for example, checking account balances and scheduling payments. Descriptions of all actions are collected in a list (referred to herein, for example, as LA). Further, the user initiates the end of session, for example, by clicking on a button labeled "End session."

In existing approaches, the session would end here, but one or more embodiments of the invention could proceed, for example, as follows. A new authentication method (referred to herein, for example, as AM2) is started. This method uses different credentials and, in one or more embodiments of the invention, even a different channel from those used for (AM1). The techniques described herein can also include a mechanism for showing the user the list (LA) or a summary of it. If LA is presented, for example, the user can be asked to confirm or cancel the session, and is asked to authenticate in either case.

In one or more embodiments of the invention, if AM2 fails, a security alarm is generated and the user is informed that the end-of-session authentication failed. The bank or other entity can also perform additional actions such as, for example, rolling back the transaction. If AM2 succeeds, the session can end as usual.

FIG. 1 is a diagram illustrating an exemplary session incorporating end-of-session authentication componentry, according to an embodiment of the present invention. By way of illustration, FIG. 1 depicts starting a session in step 102, performing a start-of-session authentication (AM1, including for example, a request for a password, PIN/TAN, etc.) in step 104 via a start-of-session (SoS) authentication module, performing actions in step 106, performing an end-of-session authentication in step 108 via an end-of-session (EoS) authentication module (AM2), and ending the session in step 110.

As described herein, an end-of-session authentication can include a second, independent authentication (noted as AM2) that includes independent parameters (for example, a separate password). An end-of-session authentication can also include an independent channel (for example, a well-known phone number, a call-back to the user, etc.) as well as show a summary of the session to define the scope of what is being authenticated. Also, as depicted in FIG. 1, an (EoS) authentication module can include a list of actions (LA) module, and in such an embodiment, authentication explicitly refers to the LA module (for example, before authenticating the user is shown the list LA). In one or more embodiments of the invention, the LA module enables the user to review the list of actions from the session.

In one or more embodiments of the invention, an end-of-session includes failure triggers such as, for example, an alarm, blocking of start-of-session (SoS) and end-of-session (EoS) authentication, as well as a roll-back of actions. Also, one or more embodiments of the invention can include performing EoS authentication at regular intervals within a session.

In contrast to the disadvantageous existing approaches noted herein, one or more embodiments of the invention include a backward scope of authentication, cover a full session (as opposed to simply one step of the session) and can cover arbitrary sessions (as opposed to merely transactions).

Figure 2:
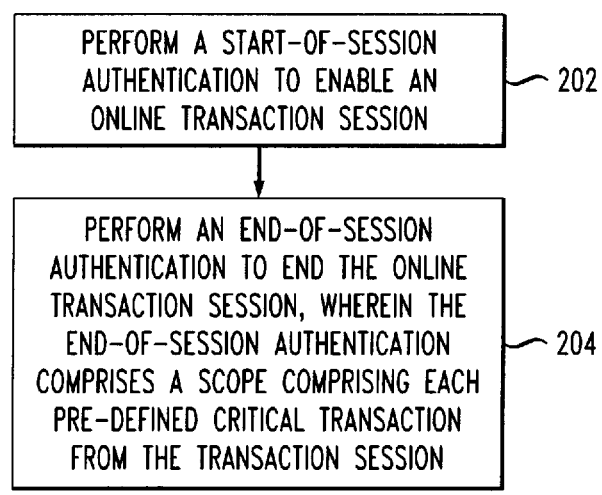
FIG. 2 is a flow diagram illustrating techniques for facilitating an online transaction session with an end-of-session authentication, according to an embodiment of the present invention.

FIG. 2 is a flow diagram illustrating techniques for facilitating an online transaction session with an end-of-session authentication, according to an embodiment of the present invention. Step 202 includes performing a start-of-session authentication to enable an online transaction session.

Step 204 includes performing an end-of-session authentication to end the online transaction session, wherein the end-of-session authentication comprises a scope comprising each pre-defined critical transaction (for example, scheduling payments) from the transaction session. Pre-defined can refer to choices made by the system provider and/or the user about which transactions to include in the scope, and how those transactions in the scope are presented at the end-of-session authentication. Transactions may be chosen by their type (for example, all payments, all declarations of intention that would require a signature on paper, etc.) or other attributes (for example, all transactions that represent a value above a certain amount, all transactions that, if combined with all previous ones from the same session, would exceed the value of the session to more than a certain amount, all transactions that move money to an account not managed by the same bank, etc.). Such determinations can be made in advance or before the session start (for example, when the provider and user sign a contract). Also, in one or more embodiments of the invention, during the session it would be acceptable to add transactions to the scope, but it would break security if transactions could be removed from the scope.

Performing an end-of-session authentication can include providing a user with a synopsis (for example, a list of each individual transaction) and/or a summary of all session activities (for example, a sum total of all transaction amounts and/or details), which can, for example, be performed out-of-band. Providing a user with a summary of all session activities can further include querying a user to confirm each pre-defined critical transaction from the transaction session and/or cancel the session.

Also, in one or more embodiments of the invention, performing an end-of-session authentication can include providing an interactive dialog that enables user-selection of one or more of the transactions from the transaction session to be used in the end-of-session authentication.

Performing an end-of-session authentication can also include querying a user to enter an end-of-session credential, wherein the end-of-session credential is different from any credential used earlier in the session. The end-of-session credential can include, for example, a password, a transaction authentication numbers, a personal identification number, a form of biometrics (for example, a fingerprint), and/or a challenge-response authentication protocol (for example, with the help of a secure authentication token). Additionally, performing an end-of-session authentication can include using an independent channel from any channel used earlier in the session.

The techniques depicted in FIG. 2 can also include raising an alarm if the end-of-session authentication fails. Further, one or more embodiments of the invention include performing a roll-back of one or more actions from the online transaction session if the end-of-session authentication fails.

The techniques depicted in FIG. 2 can also, as described herein, provide a system, wherein the system includes distinct software modules, each of the distinct software modules being embodied on a tangible computer-readable recordable storage medium. The distinct software modules can include, for example, a start-of-session (SoS) authentication module, an end-of-session (EoS) authentication module, and a list of actions (LA) module executing on a hardware processor.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system. Additionally, in one or more embodiments of the invention, parts of the software can be local, remote or a mixture of the two, and also can be pre-installed or downloaded on demand.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
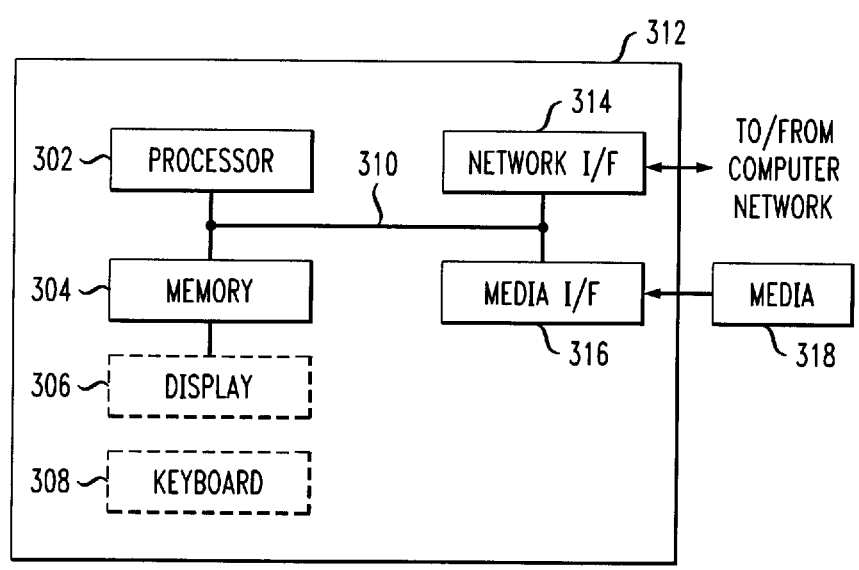
FIG. 3 is a system diagram of an exemplary computer system on which at least one embodiment of the present invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components described herein. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, adding a user authentication step to the end of a user session that includes using credentials different from those used earlier in the same session.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for facilitating an online transaction session with an end-of-session authentication, comprising the steps of:
    performing a start-of-session authentication to enable an online transaction session;
    receiving a request from a user to end the online transaction session; and performing an end-of-session authentication to end the online transaction session, wherein the end-of-session authentication comprises a scope comprising each pre-defined critical transaction from the transaction session and wherein at least one end-of-session credential is different from a credential used to initiate the online transaction session, wherein performing the end-of-session authentication comprises:
    querying the user to enter the at least one end-of-session credential, and wherein correctly entering the at least one end-of-session credential permits the online transaction session to end without starting another online transaction session;
    providing the user with a list of actions from the online transaction session; and
    enabling the user to review the list of actions and to identify, prior to authenticating the online transaction session, any false transactions in the list that were inserted into the online transaction session without user authorization.

2. The method of claim 1, wherein performing an end-of-session authentication comprises providing a user with at least one of a synopsis and a summary of all session activities.

3. The method of claim 1, wherein performing an end-of-session authentication comprises providing an interactive dialog that enables user-selection of one or more of the transactions from the transaction session to be used in the end-of-session authentication.

4. The method of claim 1, wherein performing an end-of-session authentication to end the online transaction session further comprises querying a user to at least one of confirm each pre-defined critical transaction from the transaction session and cancel the session.

5. The method of claim 1, wherein the end-of-session credential comprises at least one of a password, a transaction authentication numbers, a personal identification number, a form of biometrics, and a challenge-response authentication protocol.

6. The method of claim 1, wherein performing an end-of-session authentication comprises using an independent channel from any channel used earlier in the session.

7. The method of claim 1, further comprising raising an alarm if the end-of-session authentication fails.

8. The method of claim 1, further comprising performing a roll-back of one or more actions from the online transaction session if the end-of-session authentication fails.

9. The method of claim 1, further comprising providing a system, wherein the system comprises one or more distinct software modules, each of the one or more distinct software modules being embodied on a tangible computer-readable recordable storage medium, and wherein the one or more distinct software modules comprise a start-of-session (SoS) authentication module, an end-of-session (EoS) authentication module, and a list of actions (LA) module executing on a hardware processor.

10. A computer program product comprising a non-transitory computer readable storage medium including computer useable program code for facilitating an online transaction session with an end-of-session authentication, the computer program product including:
    computer useable program code for performing a start-of-session authentication to enable an online transaction session;
    computer useable program code for receiving a request from a user to end the online transaction session; and
    computer useable program code for performing an end-of-session authentication to end the online transaction session, wherein the end-of-session authentication comprises a scope comprising each pre-defined critical transaction from the transaction session and wherein at least one end-of-session credential is different from a credential used to initiate the online transaction session, wherein the computer useable program code for performing the end-of-session authentication comprises computer useable program code for:
    querying the user to enter the at least one end-of-session credential, and wherein correctly entering the at least one end-of-session credential permits the online transaction session to end without starting another online transaction session;
    providing the user with a list of actions from the online transaction session; and
    enabling the user to review the list of actions and to identify, prior to authenticating the online transaction session, any false transactions in the list that were inserted into the online transaction session without user authorization.

11. The computer program product of claim 10, wherein the computer useable program code for performing an end-of-session authentication comprises computer useable program code for providing a user with at least one of a synopsis and a summary of all session activities.

12. The computer program product of claim 10, wherein the computer useable program code for performing an end-of-session authentication comprises computer useable program code for providing an interactive dialog that enables user—selection of one or more of the transactions from the transaction session to be used in the end-of-session authentication.

13. The computer program product of claim 10, wherein the computer useable program code for performing an end-of-session authentication to end the online transaction session comprises computer useable program code for querying a user to at least one of confirm each pre-defined critical transaction from the transaction session and cancel the session.

14. The computer program product of claim 10, further comprising computer useable program code for raising an alarm if the end-of-session authentication fails.

15. The computer program product of claim 10, wherein the computer useable program code comprises one or more distinct software modules, and wherein the one or more distinct software modules comprise a start-of-session (SoS) authentication module, an end-of-session (EoS) authentication module, and a list of actions (LA) module executing on a hardware processor.

16. A system for facilitating an online transaction session with an end-of-session authentication, comprising:
   a memory; and
   at least one processor coupled to the memory and operative to:
      perform a start-of-session authentication to enable an online transaction session;
      receive a request from a user to end the online transaction session; and
      perform an end-of-session authentication to end the online transaction session, wherein the end-of-session authentication comprises a scope comprising each pre-defined critical transaction from the transaction session and wherein at least one end-of-session credential is different from a credential used to initiate the online transaction session, wherein the at least one processor coupled to the memory operative to perform the end-of-session authentication is further operative to:
   query the user to enter the at least one end-of-session credential, and wherein correctly entering the at least one end-of-session credential permits the online transaction session to end without starting another online transaction session;
   provide the user with a list of actions from the online transaction session; and
   enable the user to review the list of actions and to identify, prior to authenticating the online transaction session, any false transactions in the list that were inserted into the online transaction session without user authorization.

17. The system of claim 16, wherein the at least one processor coupled to the memory operative to perform an end-of-session authentication is further operative to provide a user with at least one of a synopsis and a summary of all session activities.

18. The system of claim 16, wherein the at least one processor coupled to the memory operative to perform an end-of-session authentication is further operative to provide an interactive dialog that enables user-selection of one or more of the transactions from the transaction session to be used in the end-of-session authentication.

19. The system of claim 16, wherein the at least one processor coupled to the memory operative to perform an end-of-session authentication to end the online transaction session is further operative to query a user to at least one of confirm each pre-defined critical transaction from the transaction session and cancel the session.

20. The system of claim 16, wherein the at least one processor coupled to the memory is further operative to raise an alarm if the end-of-session authentication fails.

21. The system of claim 16, further comprising a tangible computer-readable recordable storage medium having one or more distinct software modules embodied thereon, the one or more distinct software modules comprising a start-of-session (SoS) authentication module, an end-of-session (EoS) authentication module, and a list of actions (LA) module executing on a hardware processor.

22. An apparatus for facilitating an online transaction session with an end-of-session authentication, the apparatus comprising:
   means for performing a start-of-session authentication to enable an online transaction session;
   means for receiving a request from a user to end the online transaction session; and
   means for performing an end-of-session authentication to end the online transaction session, wherein the end-of-session authentication comprises a scope comprising each pre-defined critical transaction from the transaction session and wherein at least one end-of-session credential is different from a credential used to initiate the online transaction session, wherein the means for performing the end-of-session authentication comprises means for:
   querying the user to enter the at least one end-of-session credential, and wherein correctly entering the at least one end-of-session credential permits the online transaction session to end without starting another online transaction session;
   providing the user with a list of actions from the online transaction session; and
   enabling the user to review the list of actions and to identify, prior to authenticating the online transaction session, any false transactions in the list that were inserted into the online transaction session without user authorization.

* * * * *